(12) United States Patent
Ruan et al.

(10) Patent No.: US 8,641,872 B2
(45) Date of Patent: Feb. 4, 2014

(54) NON-THERMAL PLASMA SYNTHESIS WITH CARBON COMPONENT

(75) Inventors: Rongsheng Ruan, Arden Hills, MN (US); Shaobo Deng, Eden Prairie, MN (US); Zhiping Le, Jiangxi (CN); Yanling Cheng, Beijing (CN); Xiangyang Lin, Fujian (CN); Ling Chen, Roseville, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 237 days.

(21) Appl. No.: 13/119,672

(22) PCT Filed: Sep. 16, 2009

(86) PCT No.: PCT/US2009/057067
§ 371 (c)(1),
(2), (4) Date: May 27, 2011

(87) PCT Pub. No.: WO2010/033530
PCT Pub. Date: Mar. 25, 2010

(65) Prior Publication Data
US 2011/0233047 A1    Sep. 29, 2011

Related U.S. Application Data

(60) Provisional application No. 61/097,660, filed on Sep. 17, 2008.

(51) Int. Cl.
*B01J 19/12* (2006.01)
*C01C 1/04* (2006.01)

(52) U.S. Cl.
USPC ................ 204/157.46; 204/157.52

(58) Field of Classification Search
USPC ...................... 204/157.46, 157.52
See application file for complete search history.

(56) References Cited

U.S. PATENT DOCUMENTS 1,334,590 A * 3/1920 Bloom .............. 204/157.46
2,134,206 A * 10/1938 Roberts, Jr. ........ 204/157.46
2,500,008 A * 3/1950 Richardson ......... 204/157.46

(Continued)

FOREIGN PATENT DOCUMENTS

CN          101254452 A  *  9/2008
JP          2001151507 A     6/2001
JP          2002241774 A  *  8/2002

OTHER PUBLICATIONS

EP Office Action from PCT/US2009/057067, dated Mar. 22, 2011.*

(Continued)

*Primary Examiner* — Keith Hendricks
*Assistant Examiner* — Colleen M Raphael
(74) *Attorney, Agent, or Firm* — Westman, Champlin & Koehler, P.A.; Z. Peter Sawicki; Visala Goswitz

(57) ABSTRACT

The disclosure herein describes a method for producing ammonia by introducing $N_2$, CO and water into a non-thermal plasma in the presence of a catalyst, the catalyst being effective to promote the disassociation of $N_2$, CO and water to form reactants that in turn react to produce $NH_3$ and $CH_4$.
This disclosure also describes producing a reactive hydrogen ion or free radical by the method comprising passing water through a non-thermal plasma in the presence of a catalyst, the catalyst being effective to promote the dissociation of water.

14 Claims, 5 Drawing Sheets

(56) References Cited

U.S. PATENT DOCUMENTS

| | | | | |
|---|---|---|---|---|
| 2,925,335 | A | * | 2/1960 | Donath .................. 423/650 |
| 4,699,772 | A | | 10/1987 | de Lathouder |
| 6,471,932 | B1 | * | 10/2002 | Gieshoff et al. ......... 204/157.46 |
| 6,517,794 | B2 | * | 2/2003 | Gieshoff et al. ......... 204/157.46 |
| 7,188,469 | B2 | * | 3/2007 | Bonadies et al. ............. 423/650 |
| 7,736,400 | B2 | * | 6/2010 | Rabovitser et al. ........... 204/164 |
| 2002/0095866 | A1 | * | 7/2002 | Hassett .................. 422/188 |
| 2007/0025903 | A1 | | 2/2007 | Kong et al. |
| 2008/0089820 | A1 | | 4/2008 | Jacob |

OTHER PUBLICATIONS

Bai et al, "Plasma Synthesis of Ammonia With a Microgap Dielectric Barrier Discharge at Ambient Pressure," IEEE Transactions on Plasma Science, vol. 31, No. 6, Dec. 2003, pp. 1285-1291.*

* cited by examiner

NON-THERMAL PLASMA SYNTHESIS WITH CARBON COMPONENT

This Application is a Section 371 National Stage Application of International Application No. PCT/US2009/057067 filed Sep. 16, 2009 and published as WO 2010/033530 A2 on Mar. 25, 2010, the content of which is hereby incorporated by reference in its entirety.

This invention relates to non-thermal plasma reactors and to the use of non-thermal plasma to dissociate molecules in a gas phase using low energy levels to produce reactants that form reacting products.

Adverse environmental impact, rising non-renewable chemical feedstock costs, safety, and costs associated with waste management and equipment are serious concerns of the chemical and energy industries. Many chemical synthesis involve chemical reactions under severe conditions which generate polluting and hazardous wastes. Aimed at reducing or eliminating the use and generation of hazardous substances in chemical synthesis, the concept of "sustainable chemistry" or "green chemistry" gained acceptance about two decades ago.

One important chemical process is the production of fertilizer. For most agricultural crops, fertilizers are necessary to optimize yield. The invention of synthetic nitrogen fertilizer is arguably one of the great innovations of the agricultural revolution in the 19th-century. Nitrogen fertilizer is a necessary macronutrient and is applied infrequently and normally prior to or concurrently with seeding. Nitrogen based fertilizers include ammonia, ammonium nitrate and anhydrous urea, all being products based on the production of ammonia.

Ammonia is generated from a process commonly known as the Haber-Bosch Process. The Haber-Bosch Process includes the reaction of nitrogen and hydrogen to produce ammonia. The Haber-Bosch Process has been used since the early 1900s to produce ammonia which in turn has been used to produce the early 1900s to produce ammonia which in turn has been used to produce anhydrous ammonia, ammonium nitrate and urea for use as fertilizer. The Haber-Bosch Process utilizes nitrogen obtained from air by fractional distillation and hydrogen obtained from methane (natural gas) or naphtha. There is an estimate that the Haber-Bosch Process produces 100 million tons of nitrogen fertilizer per year and consumes approximately 1% of the world's annual energy supply. Nitrogen fertilizer, however, is responsible for sustaining approximately 40% of the earth's population.

There are also other processes that require significant amounts of energy performed in traditional or conventional conditions. For example, Synthetic gas (Syngas) made primarily of carbon monoxide and $H_2$ may be used to form various synthetic hydrocarbon products. Syngas is made through gasification of a solid carbon based source such as coal or biomass. One example of use of Syngas as a feedstock is the Fischer-Tropsch process which is a catalyzed reaction wherein carbon monoxide and hydrogen are converted into various liquid hydrocarbons. Typical catalysts used are based on iron, cobalt and ruthenium. Resulting products are synthetic waxes, synthetic fuels and olefins.

SUMMARY OF THE INVENTION

The disclosure herein describes a method for producing ammonia by introducing $N_2$, CO and water into a non-thermal plasma in the presence of a catalyst, the catalyst being effective to promote the disassociation of $N_2$, CO and water to form reactants that in turn react to produce $NH_3$ and $CH_4$.

This disclosure also describes producing a reactive hydrogen ion or free radical by the method comprising passing water through a non-thermal plasma in the presence of a catalyst, the catalyst being effective to promote the dissociation of water.

DETAILED DESCRIPTION

One aspect of the present disclosure relates to a method in which a Non-thermal plasma (NTP) in a silent discharge (dielectric barrier discharge) reactor is used to assist a catalyzed reaction to increase ammonia production. In an application filed by the inventor herein on Aug. 21, 2008 under the Patent Cooperation Treaty having Serial Number US08/09948 titled Non-Thermal Plasma Synthesis of Ammonia (Publication No. WO 2009-025835A1), ammonia production utilizing a non-thermal plasma reactor in which a catalyst system comprising Ru—Pt—Cs/MgO was used to produce ammonia was described and which is hereby incorporated in its entirety. However, as was discovered, the ammonia content was limited due to the formation of $N_2O$ and NO. If oxygen was eliminated, it is believed that the reaction would move towards the direction favoring more ammonia production.

Figure 1:
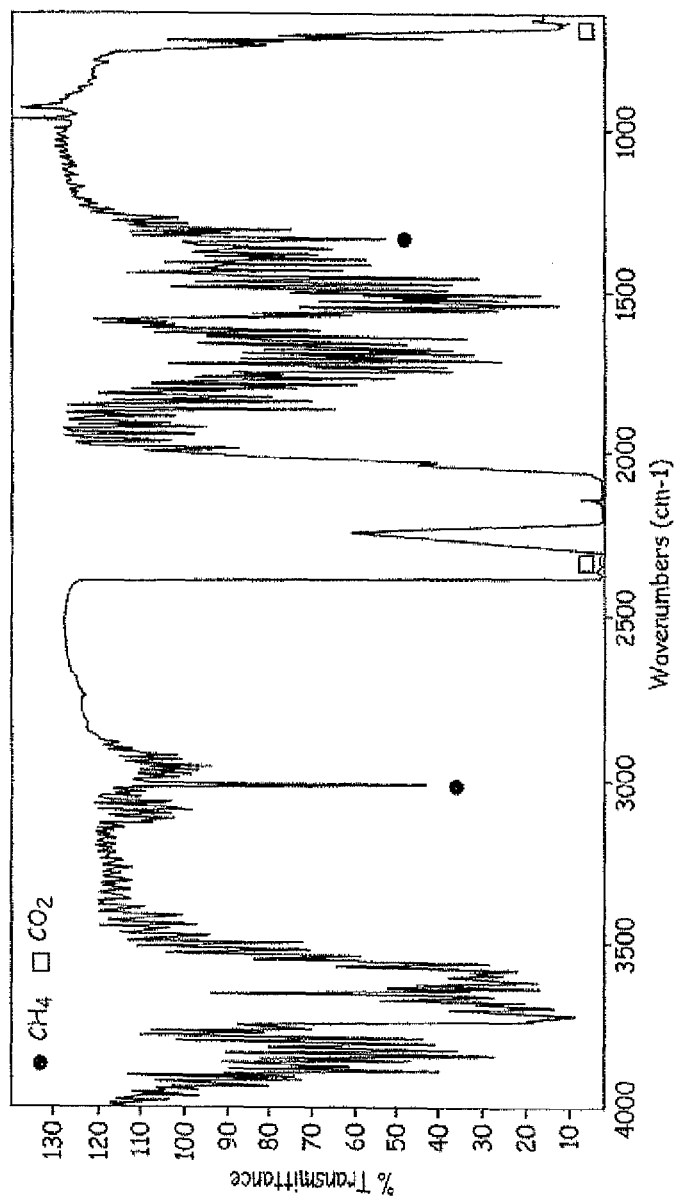
FIG. 1 is a graphical view of an FT-IR spectroscopy of reaction production of CO and $H_2O$.

We have found that the introduction of CO into the above reaction system reduces the amount of $O_2$. The addition of CO increased the ammonia yield due to $CO_2$ formation. The formation of $CO_2$ eliminates O free radicals thereby reducing the formation of $N_2O$ and NO. CO and $H_2$ can form hydrocarbons in a Fisher-Tropsch synthesis. Like N—N bond in $N_2$, the C—O bond in $CO_2$ can be broken. The resulting C free radical can form a hydrocarbon with the H free radical from water vapor. This is evidenced by the results shown in FT/IR spectroscopy of FIG. 1. The formation of $CO_2$ suggests that O was removed by the reactions. It is believed that the reactions are as follows:

$$CO \rightarrow C+O$$

$$H_2O \rightarrow H+OH$$

$$C+H \rightarrow CH$$

$$C+OH \rightarrow CH+O$$

$$CH+H \rightarrow CH_2$$

$$CH_2+H \rightarrow CH_3$$

$$CH_3+H \rightarrow CH_4$$

$$2OH \rightarrow H_2O_2$$

$$H_2O_2 \rightarrow H_2O+O$$

$$CO+O \rightarrow CO_2$$

Figure 2:
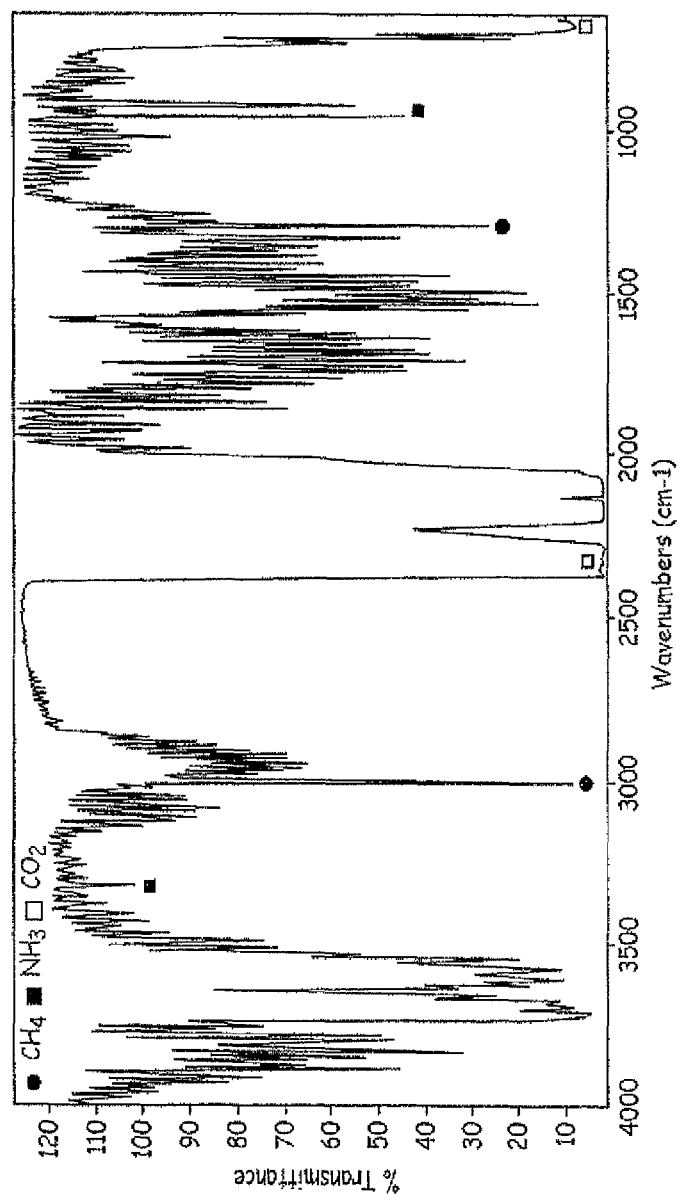
FIG. 2 is a graphical view of FT-IR spectroscopy of reaction production of $N_2$, CO and $H_2O$.

When $N_2$ was added to the system, it was found that ammonia, methane along with other hydrocarbons and other chemicals were formed in the product stream as indicated in the FT-IR spectroscopy of FIG. 2. The possible chemical pathways when $N_2$ was added are as follows:

$$H_2O \rightarrow H+OH$$

$$N_2 \rightarrow N+N$$

$$N+H \rightarrow NH$$

$$N+OH \rightarrow NH+O$$

$$NH+H \rightarrow NH_2$$

$$NH_2+H \rightarrow NH_3$$

$$2OH \rightarrow H_2O_2$$

$$H_2O_2 \rightarrow H_2O+O$$

$$N+O \rightarrow NO$$

$$N+NO \rightarrow N_2O$$

Figure 3:
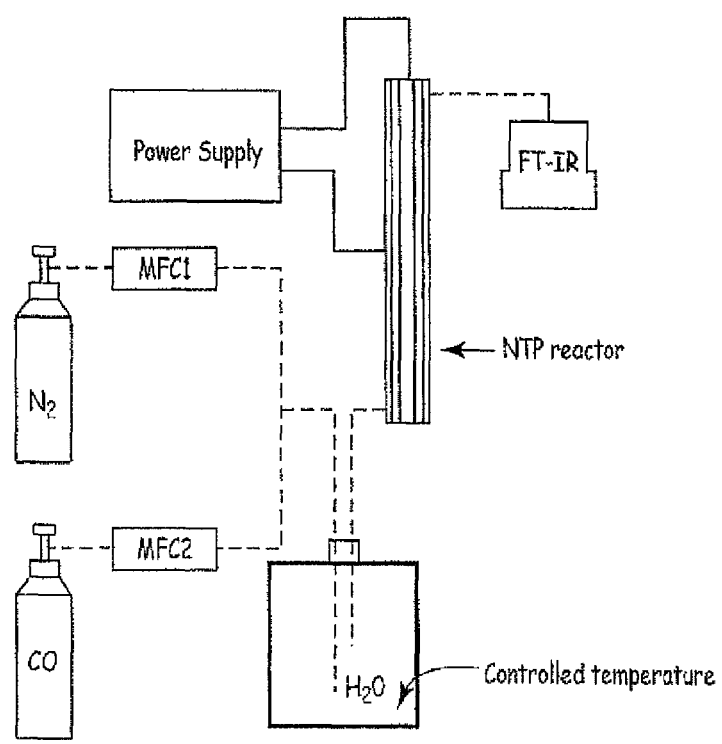
FIG. 3 is a schematic view of one embodiment of the apparatus used to produce ammonia and methane.

FIG. 3 illustrates the experimental setup that was used to produce the results herein described.

In the experimental setup of FIG. 3, $N_2$ and CO are provided in gaseous form. The rate of $N_2$ and CO are controlled by master flow controllers, $MfC_1$ and $MfC_2$, respectively. $N_2$ and CO are mixed and transported into a tank containing water. The temperature of the water is controlled by an automatic temperature controller. The temperature of the water may be between 0 and 100° C. The closer the temperature is to 100° C., the more water vapor is generated. The temperature of the water is maintained at a temperature sufficient to provide water vapor in stoichiometric excess to the NTP reactor. The $N_2$ and CO gas mixture is passed through the water, and mixes with the water vapor, carrying the water vapor into the NTP reactor.

In addition to the Ru—Pt—Cs/MgO catalyst system, it is believed that K/Ru, Cs/Ru, Ca/ru, Fe/Ru, Co/Ru, Ni/Ru, and La/Ru may be substituted for the catalyst combination of Cs/Ru. It is believed that these combinations of catalysts work similar to the Cs/Ru catalyst combination in that a promoter catalyst is ionized at a low energy level and produces electrons which are passed onto catalyst Ru.

Figure 4:
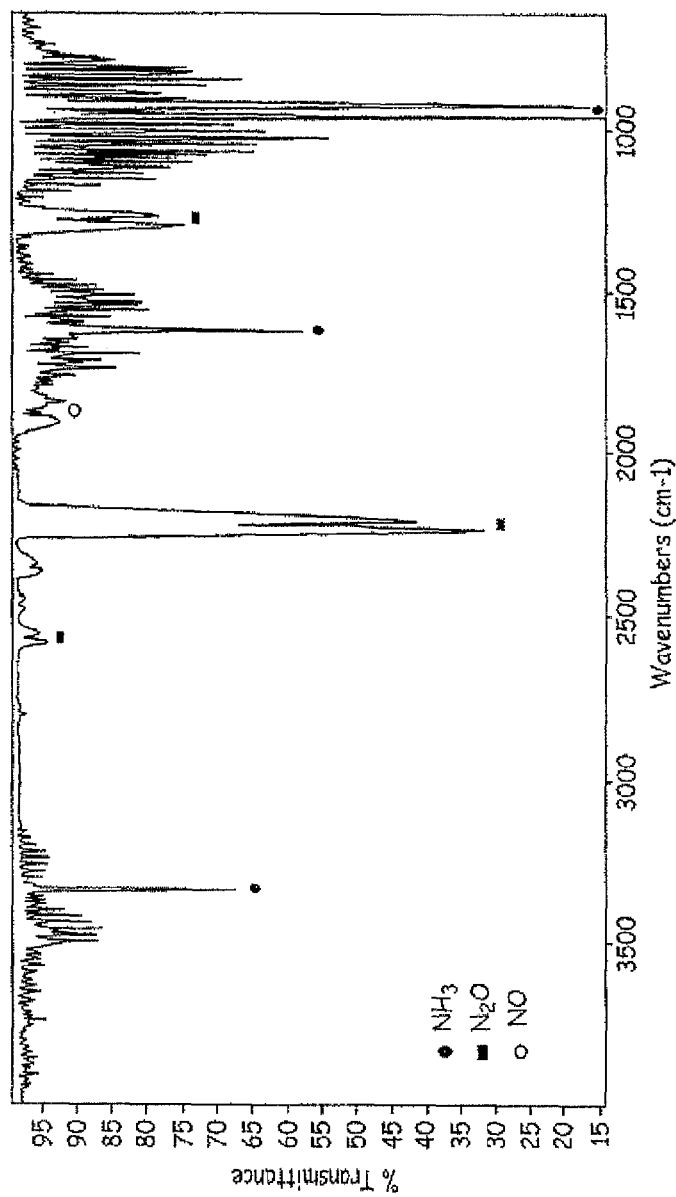
FIG. 4 is a graphical view of an FT-IR spectroscopy of reaction of $N_2$ and $H_2O$ on Ru—Pt—Cs/MgO catalyst.

FIG. 4 shows gas samples by FT-IR at the outlet of the NTP. FIG. 4 shows that the gas contained $NH_3$, $N_2O$, and NO when the feed contained $N_2$ and water vapor. The NTP reactor with the catalyst of Ru—Pt—Cs/MgO provided the energy to break the O—H and N—N bonds, resulting in N, H, OH and O free radicals. The N and H free radicals then combined to form $NH_3$, it is believed according to the following reactions:

$$H_2O \rightarrow H+OH$$

$$N_2 \rightarrow N+N$$

$$N+H \rightarrow NH$$

$$N+OH \rightarrow NH+O$$

$$NH+H \rightarrow NH_2$$

$$NH_2+H \rightarrow NH_3$$

$$2OH \rightarrow H_2O_2$$

$$H_2O_2 \rightarrow H_2O+O$$

$$N+O \rightarrow NO$$

$$N+NO \rightarrow N_2O$$

Formation of ammonia and methane was found to vary with reaction conditions such as temperature, ratio of $N_2$ to CO and the feed gas, NTP related processing parameters and residence time. It is believed that the amount of ammonia and methane formed increases with increasing temperature likely due to the increased water vapor and thus higher concentration of H free radicals at higher temperatures as illustrated in Table 1.

TABLE 1

Effect of gas to water ratio on reaction

| | Temperature (° C.) | | |
|---|---|---|---|
| | 26 | 30 | 38 |
| $NH_3$/ppm | 9600 | 10000 | 14000 |
| $CH_4$/ppm | 5900 | 8300 | 21000 |

NTP reactor was operated at 6 KV, 8 KHz. Catalyst used was Ru—Cs/MgO. Gas flow rates: $N_2$: 50 ml/min, CO: 0.2 ml/min.

The effect of $N_2$ levels to CO (in ratio form) on the reaction is shown in Table 2.

TABLE 2

Effect of ratio of $N_2$ and CO on reaction

| | $CO:N_2$ | | | |
|---|---|---|---|---|
| | 50:0.2 | 45:5 | 40:10 | 0.2:50 |
| $NH_3$/ppm | 5000 | 5600 | 6400 | 9600 |
| $CH_4$/ppm | 33000 | 25000 | 22000 | 5900 |

6 KV, 8 KHz, T=26° C., Ru—Cs/MgO

Ammonia formation increases with increasing $N_2$ levels while methane formation increases with increasing CO levels.

Table 3, set forth below, shows that the amount of ammonia and methane formed increases with increasing plasma voltage. This can be attributed to the enhanced dissociation of molecular bonds at a higher electric field discharge.

TABLE 3

Effect of plasma voltage on reaction

| | KV | | |
|---|---|---|---|
| | 5 | 6 | 7 |
| $NH_3$/ppm | 8300 | 9100 | 12300 |
| $CH_4$/ppm | 13000 | 15000 | 24000 |

T=26° C., 8 KHz, Ru—Cs—K/MgO, CO: 45 ml/min, $N_2$: 5 ml/min

An increased frequency of high voltage power promotes ammonia formation also, but has little influence on methane formation as shown in Table 4.

TABLE 4

Effect of plasma frequency on reaction

| | KHz | | |
|---|---|---|---|
| | 7 | 8 | 9 |
| $NH_3$/ppm | 2000 | 12300 | 7500 |
| $CH_4$/ppm | 25500 | 24000 | 24000 |

T=26° C., 6 KV, Ru—Cs—K/MgO, CO: 45 ml/min, $N_2$:5 ml/min

The concentration of ammonia or methane increased with reaction time. It is noticed that the formation of methane from reaction of CO and $H_2O$ is faster than that of ammonia from reaction of $N_2$ and $H_2O$. This may be due to the difference in the polarity between $N_2$ and CO. N—N is a non-polar bond while C—O is a polar bond. The result suggests that the polar bond is easier to become dissociated than non-polar bond under the NTP environment.

TABLE 5

Effect of residence time on reaction

| | Time/min | | | | | | |
|---|---|---|---|---|---|---|---|
| | 5 | 10 | 15 | 20 | 30 | 40 | 50 |
| $NH_3$/ppm | 3500 | 4400 | 4800 | 5500 | 6500 | 7100 | 7500 |
| $CH_4$/ppm | 23000 | 24000 | 24000 | 24000 | 24000 | 24000 | 24000 |

T=26° C., 6 KV, 8 KHz, Ru—Cs—K/MgO, CO: 45 ml/min, $N_2$: 5 ml/min

This invention shows that subcatalytic reactions which traditionally need high pressure and high temperature conditions to proceed can proceed under low pressures in ambient pressure with the assistance of a non-thermal plasma. The NTP effectively provides energy to overcome certain reaction barriers. It is believed that a non-thermal plasma works in synergy with certain catalysts directly dissociating gaseous molecules reactant to form highly reactive free radicals or ions while also possibly reducing the activation energy required by the catalysts to function efficiently.

Figure 5:
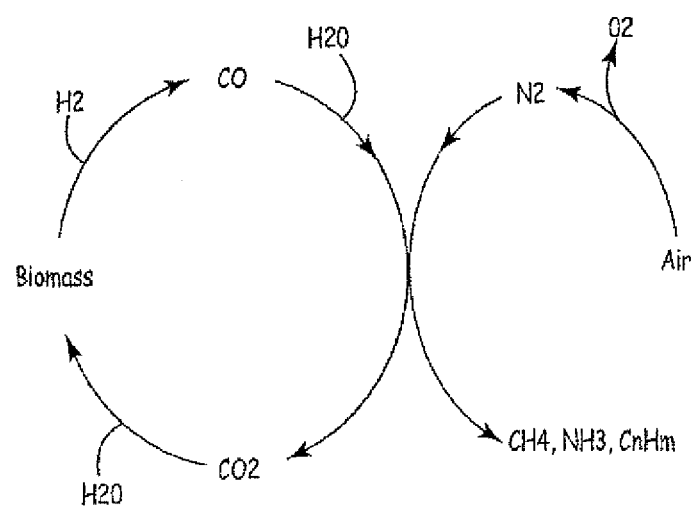
FIG. 5 is a schematic view of one reaction scheme of this invention.

In the particular example described herein and as illustrated in FIG. 5, NTP assisted catalysis makes it possible to use water as a clean feed stock or a hydrogen source in chemical synthesis. The formation of methane and possibly other hydrocarbons in the CO—$H_2O$ reaction system described herein in a NTP environment suggests a possible pathway for making hydrocarbon fuels from water and CO. CO is readily available from combustion of biomass in an incomplete combustion environment. Moreover, a NTP assisted catalysis has a broader impact on chemical synthesis through "green chemistry" by utilizing renewable feed stocks such as water and biomass while producing no hazardous waste under mild conditions.

Although the present invention has been described with reference to preferred embodiments, workers skilled in the art will recognize that changes may be made in form and detail without departing from the spirit and scope of the invention.

What is claimed is:

1. A method for producing ammonia, the method comprising:
introducing $N_2$, CO and $H_2O$ into a non-thermal plasma in the presence of a catalyst and a promoter, the catalyst and the promoter being effective to promote the dissociation of $N_2$, CO and $H_2O$ to reactants that in turn then react to produce $NH_3$ and $CH_4$, wherein the promoter is cesium or potassium.

2. The method of claim 1 wherein the $H_2O$ is passed into the reactor by passing CO and $N_2$ gas through liquid water with the $N_2$ and CO carrying the water into the non-thermal plasma.

3. The method of claim 1 wherein the catalyst is an electron donor.

4. The method of claim 1 wherein the catalyst is Ruthenium.

5. The method of claim 1 wherein the catalyst is Ruthenium and the promoter is an electron donor having an ionization energy less than Ruthenium.

6. The method of claim 1 wherein the catalyst is provided in a packed bed through which the $N_2$, CO and $H_2O$ flow.

7. The method of claim 1 wherein an additional reaction product is CnHm where n is greater than 1 and m is greater than 4.

8. The method of claim 1 wherein the CO is obtained from biomass through an incomplete combustion.

9. A method of producing a reactive hydrogen ion, hydrogen radical and/or carbon free radical, the method comprising passing water through a non-thermal plasma in the presence of a catalyst and a promoter, the catalyst and the promoter being effective to promote the dissociation of water and production of reactive carbon free radicals, wherein the promoter is cesium or potassium.

10. The method of claim 9 wherein the catalyst is an electron donor.

11. The method of claim 9 wherein the catalyst is Ruthenium.

12. The method of claim 9 wherein the catalyst is Ruthenium and the promoter is an electron donor having an ionization energy less than Ruthenium.

13. The method of claim 9 wherein the catalyst is provided in a packed bed through which the water is passed.

14. The method of claim 13 where-in the water is passed through the packed bed using a carrier gas.

* * * * *

UNITED STATES PATENT AND TRADEMARK OFFICE
CERTIFICATE OF CORRECTION

PATENT NO. : 8,641,872 B2  Page 1 of 1
APPLICATION NO. : 13/119672
DATED : February 4, 2014
INVENTOR(S) : Ruan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 308 days.

Signed and Sealed this
Twenty-second Day of September, 2015

Michelle K. Lee
*Director of the United States Patent and Trademark Office*